(12) United States Patent  
Chilson

(10) Patent No.: US 10,299,529 B2  
(45) Date of Patent: *May 28, 2019

(54) HELMET COMPRISING SURFACE REINFORCING COMPONENT WITH EMBEDDED ANCHORS

(71) Applicant: Smith Optics, Inc., Portland, OR (US)

(72) Inventor: James A. Chilson, Portland, OR (US)

(73) Assignee: Smith Optics, Inc., Portland, OR (US)

( * ) Notice: Subject to any disclaimer, the term of this patent is extended or adjusted under 35 U.S.C. 154(b) by 309 days.

This patent is subject to a terminal disclaimer.

(21) Appl. No.: 15/181,255

(22) Filed: Jun. 13, 2016

(65) Prior Publication Data

US 2016/0286887 A1 Oct. 6, 2016

Related U.S. Application Data

(63) Continuation of application No. 12/687,830, filed on Jan. 14, 2010, now Pat. No. 9,364,041.

(51) Int. Cl.
| | |
|---|---|
| *A42B 3/06* | (2006.01) |
| *A42B 3/28* | (2006.01) |
| *B29C 44/12* | (2006.01) |
| *B29C 44/56* | (2006.01) |
| *B29K 25/00* | (2006.01) |
| *B29L 31/48* | (2006.01) |

(52) U.S. Cl.
CPC .............. *A42B 3/063* (2013.01); *A42B 3/062* (2013.01); *A42B 3/283* (2013.01); *B29C 44/12* (2013.01); *B29C 44/1214* (2013.01); *B29C 44/5681* (2013.01); *B29K 2025/06* (2013.01); *B29L 2031/4821* (2013.01)

(58) Field of Classification Search
CPC .......... A42B 3/063; A42B 3/062; A42B 3/283
See application file for complete search history.

(56) References Cited

U.S. PATENT DOCUMENTS

| 4,996,724 A | * | 3/1991 | Dextrase | ................ A42B 3/066 2/411 |
|---|---|---|---|---|
| 5,077,839 A | | 1/1992 | Keller | |
| 5,083,321 A | | 1/1992 | Davidsson | |
| 5,119,516 A | | 6/1992 | Broersma | |
| D340,318 S | | 10/1993 | McCloud | |

(Continued)

FOREIGN PATENT DOCUMENTS

| EP | 0879566 A2 | 11/1998 |
|---|---|---|
| JP | 11-021716 | 1/1999 |
| JP | 2000-080514 | 3/2000 |

OTHER PUBLICATIONS

Extended European search report dated Jun. 25, 2014 for European appln No. 10843386.3.

(Continued)

*Primary Examiner* — Andrew W Sutton
(74) *Attorney, Agent, or Firm* — Dorsey & Whitney LLP

(57) ABSTRACT

Described herein are helmets comprising at least one surface reinforcing component. In some embodiments the surface reinforcing component comprises at least one anchoring feature embedded in a structural feature of the helmet, such as a force absorbing element. In other embodiments, the surface reinforcing component comprises fasteners configured to mate with a respective fastener on a shell of the helmet.

25 Claims, 7 Drawing Sheets

(56) References Cited

U.S. PATENT DOCUMENTS

| | | | |
|---|---|---|---|
| D340,544 S | 10/1993 | Kamata | |
| 5,309,576 A | 5/1994 | Broersma | |
| 5,441,436 A * | 8/1995 | Moretz | A41B 9/004 2/73 |
| 5,517,691 A | 5/1996 | Blake | |
| 5,547,733 A * | 8/1996 | Rock | B32B 5/26 428/91 |
| 5,745,924 A | 5/1998 | Egger | |
| 5,823,012 A * | 10/1998 | Hacskaylo | A41D 20/00 66/171 |
| 5,898,950 A | 5/1999 | Spyrou et al. | |
| 6,105,176 A | 8/2000 | Egger | |
| 6,427,493 B1 * | 8/2002 | Kasdan | D04B 1/16 66/169 R |
| 6,484,325 B1 * | 11/2002 | Lazarus | A41D 13/015 2/462 |
| 6,658,671 B1 * | 12/2003 | Von Holst | A42B 3/064 2/412 |
| D495,093 S | 8/2004 | Tintera | |
| 6,854,133 B2 | 2/2005 | Lee et al. | |
| D504,543 S | 4/2005 | Strauss | |
| D508,150 S | 8/2005 | Martin | |
| D530,043 S | 10/2006 | Foote et al. | |
| D532,161 S | 11/2006 | Finquel | |
| D535,059 S | 1/2007 | Lam | |
| D549,394 S | 8/2007 | Broeckl | |
| D556,951 S | 12/2007 | Gath | |
| D572,865 S | 7/2008 | Baker | |
| D608,504 S | 1/2010 | Baker | |
| D628,346 S | 11/2010 | Petzl | |
| D628,749 S | 12/2010 | Daniel | |
| 7,975,320 B2 | 7/2011 | Muskovitz et al. | |
| D645,210 S | 9/2011 | Chilson et al. | |
| D650,132 S | 12/2011 | Chilson et al. | |
| 9,364,041 B2 | 6/2016 | Chilson | |
| 2001/0039674 A1 * | 11/2001 | Shida | A42B 3/283 2/414 |
| 2004/0019958 A1 * | 2/2004 | Arai | A42B 3/223 2/424 |
| 2004/0064873 A1 * | 4/2004 | Muskovitz | A42B 3/283 2/410 |
| 2004/0123378 A1 | 7/2004 | Timms et al. | |
| 2004/0158914 A1 | 8/2004 | Tanaka | |
| 2004/0171319 A1 * | 9/2004 | Yoon | D03D 15/00 442/59 |
| 2005/0283885 A1 | 12/2005 | Stroud et al. | |
| 2006/0046616 A1 * | 3/2006 | Alessi | A41D 1/215 450/81 |
| 2007/0093162 A1 * | 4/2007 | Holcombe | D03D 15/00 442/208 |
| 2007/0130672 A1 | 6/2007 | Beddoe et al. | |
| 2009/0055999 A1 | 3/2009 | Garcia | |
| 2010/0180362 A1 | 7/2010 | Glogowski et al. | |
| 2012/0180199 A1 | 7/2012 | Chilson et al. | |
| 2012/0216339 A1 | 8/2012 | Nimmons et al. | |
| 2012/0233745 A1 | 9/2012 | Veazie | |

OTHER PUBLICATIONS

International Search Report dated May 30, 2011 regarding Application No. PCT/US2010/048640.
Office action dated Jun. 22, 2015 for EP Appln No. 10 843 386.3.
Office Action dated Jul. 24, 2014 for CA Appln No. 2787019.

* cited by examiner

HELMET COMPRISING SURFACE REINFORCING COMPONENT WITH EMBEDDED ANCHORS

CROSS-REFERENCE TO RELATED APPLICATION

This application is a continuation of U.S. patent application Ser. No. 12/687,830, filed Jan. 14, 2010, issued as U.S. Pat. No. 9,364,041 on Jun. 14, 2016, the disclosure of which is incorporated herein by reference, in its entirety, for any purpose.

TECHNICAL FIELD

This invention is directed to helmets, and more particularly one or more embodiments are directed to helmets comprising surface reinforcing components.

BACKGROUND OF THE INVENTION

Helmets and other forms of protective headgear have become increasingly popular in recent years as users have become more aware and concerned about preventing head injuries. Numerous types of helmet design are available for users to select from for use when participating in physical activities, such as outdoor sports.

In general, a helmet must be strong enough to protect a user from a head injury in an anticipated accident. One way to make a helmet strong is to increase the thickness of the helmet. In sports activities, however, helmets are preferably made to be as lightweight as possible to not interfere with a user's balance, provide comfort, or substantially increase a user's mass. Furthermore, helmets are preferably made without bulk so that the helmet does not interfere with the user's line of sight. In order for a helmet to be durable enough to protect a user's head, helmets in the past have been made thicker and with more material to the detriment of the weight of the helmet.

Helmets used in highly active sports, such as skiing or biking, may further include vents to cool a user's head. Vents or openings in a helmet reduce the thickness in the area of the helmet surrounding the vent, which may be referred to as a chimney. Therefore, the chimney and other areas surrounding the vent may be designed thicker to accommodate the vent. This may result in bulkier and in some cases heavier helmets. Furthermore, increases in the size of a vent may result in a bulkier helmet.

There is, therefore, a continuing need for thin, lightweight, and durable helmets and methods of minimizing the weight of helmets without decreasing their strength.

DETAILED DESCRIPTION OF PREFERRED EMBODIMENTS

Embodiments of the present invention are directed toward helmets, and more particularly one or more embodiments are directed to helmets comprising surface reinforcing components. Some embodiments relate to helmets comprising one or more surface reinforcing components with anchoring features embedded in a structural feature of the helmet, such as a force absorbing element. Certain details are set forth below to provide a sufficient understanding of the invention. However, it will be clear to one skilled in the art that the invention may be practiced without these particular details.

Figure 1A:
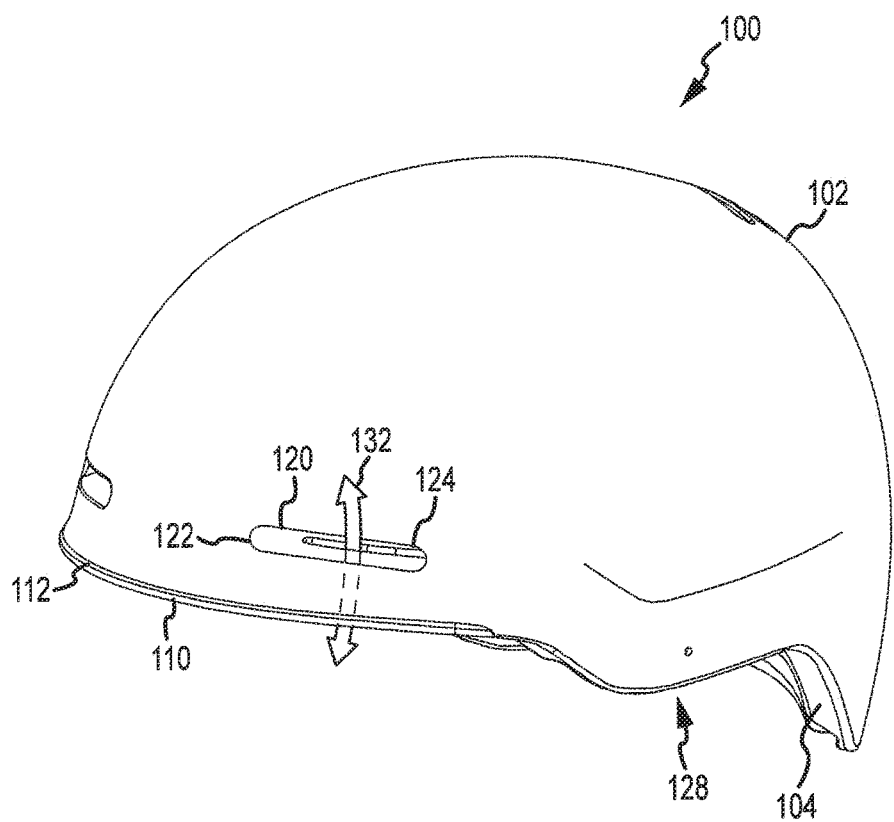
FIG. 1A is a top left isometric view of a helmet according to one embodiment of the invention.

FIG. 1A is a top left isometric view of a helmet 100 according to one embodiment of the invention. The helmet 100 may include a shell 102, a structural component, such as a force absorbing element 104, a surface reinforcing component 110, and an internal cavity 128 for receiving a user's head. The helmet 100 may further include one or more vents 120. The vent 120 may be an opening that extends through the shell 102, the force absorbing element 104, such as a solid form material, and/or the surface reinforcing component 110. The vent may allow external air to enter the internal cavity 128 and/or direct air in front of a user's face as is indicated by the arrow 132 in FIG. 1A. In some embodiments, the force absorbing element 104 may be polystyrene, such as expanded polystyrene foam.

Figure 1B:
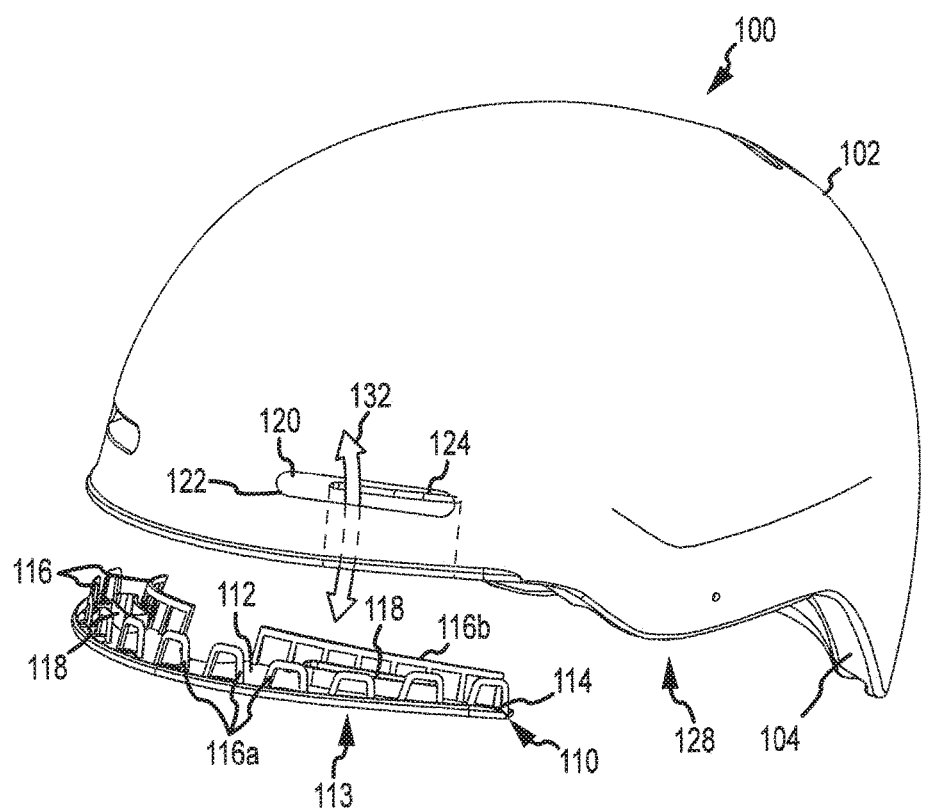
FIG. 1B is an exploded top left isometric view of the helmet shown in FIG. 1A.

FIG. 1B is an exploded top left isometric view of the helmet shown in FIG. 1A. In particular, FIG. 1B shows the surface reinforcing component 110 separate from the rest of the helmet 100. The surface reinforcing component 110 may include an outer surface 113, an inner surface 112, and at least one anchor feature 116. The surface reinforcing component 110 may further include a lip 114 and one or more vent reinforcement features 118. The lip 114 may further act as a brim feature for the helmet 100. As will be clear to a person having ordinary skill in the art, the brim feature may be any other suitable shape, such as an outerwardly extending brim that acts as a sun block. In some embodiments, the anchor feature 116 comprises a plurality of anchor features 116, such as anchor features 116a. In other embodiments, the anchor feature 116 is a single interconnected anchor feature, such as anchor feature 116b, or a combination of a plurality of anchor features 116a and interconnected anchor features 116b. In one embodiment, the combination of the lip 114 or brim feature and the anchor features 116 on the surface reinforcing component 110 produces a lightweight yet strong brim or edge.

When the surface reinforcing component 110 is attached to the force absorbing element 104, the anchor features 116 may be embedded in the force absorbing element 104. In particular, the inner surface 112 of the surface reinforcing component 110 may be secured to an outer surface of the force absorbing element 104 and the anchor features 116 embedded into the material of the force absorbing element 104. In some embodiments, the anchor features 16 are completely embedded into the force absorbing element. In one embodiment, the surface reinforcing component 110 may be further secured to the shell 102. For instance, in FIG. 1A the lip 114 of the surface reinforcing component 110 is secured to the shell 102.

The anchor features 116 may be a variety shapes. The anchor features 116 may be any appropriate shape that may be embedded into the force absorbing element 104. For instance, in some embodiments the anchor feature may be a tab, loop, hook, pin, T-shape, L-shaped or any other shaped operable to be embedded into the force absorbing element 104. In FIGS. 1A and 1B, the anchor features 116 are loop-shaped. When the loop-shaped anchor feature 116 is embedded into the force absorbing element 104, the force absorbing element 104 may surround an inner portion of the loop-shaped anchor feature 116.

In some embodiments, the anchor features 116 provide structural integrity to at least a portion of the helmet 100. In particular, the anchor features may reinforce a portion of the force absorbing element 104 and/or the shell 102. By reinforcing a portion of the force absorbing element 104 and/or shell 102, the force absorbing element 104 and/or the shell 102 may be made with less material. By using less material, the helmet 100 may be made thinner and potentially lighter in weight. Additionally, the surface reinforcing components 110 may add structural integrity to the helmet, such as the shell 102 and/or the force absorbing element 104. In particular, the structural integrity of the helmet near the surface reinforcing component 110 may be stronger than at other areas of the helmet. In some embodiments, the anchor features 116 may be added to the helmet at locations expected to receive the highest impact in an accident. By providing a surface reinforcing component 110 at an edge of the shell 102, the surface reinforcing component 110 is able to structurally reinforce the shell 102. In some embodiments, the lip 114 of the surface reinforcing component 110 structurally reinforces at least a portion of the shell 102, such as the edge of the shell 102. In some embodiments, the shell 102 may be made thinner due to the surface reinforcing component 110.

Figure 1C:
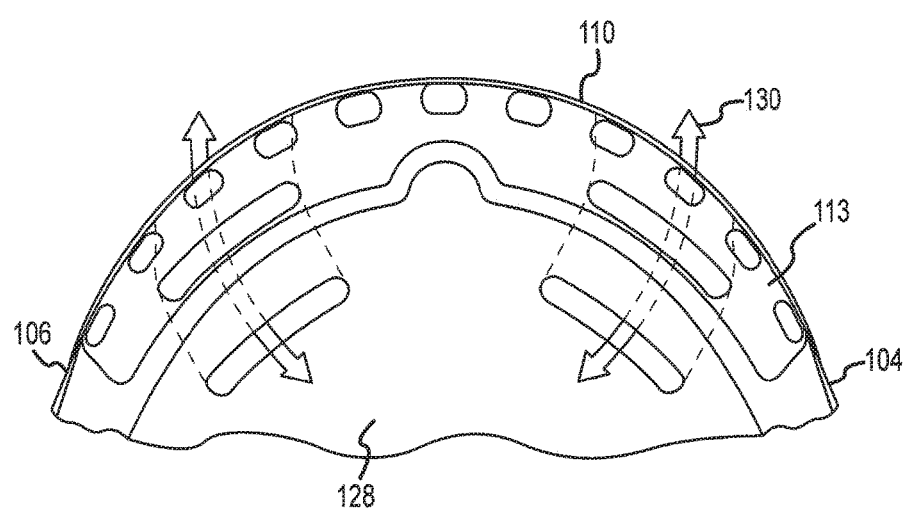
FIG. 1C is a partial schematic drawing of an underside view of the helmet shown in FIG. 1A.

FIG. 1C is a partial schematic drawing of an underside view of the helmet shown in FIG. 1A. The surface reinforcing component 110 extends along the surface of the force absorbing element 104. As indicated above, the helmet may include one or more vents 120. As is illustrated in FIGS. 1A-1C, each vent 120 may include a horizontal passage 122 and a vertical passage 124. That is, the vents 120 may be T-shaped. The horizontal passage 122 may be an opening in the shell 102 and the force absorbing element 104 to allow air from the outside of the helmet 100 to enter into the internal cavity 128 as indicated by arrow 130 in FIG. 1C. The vertical passage 124 may be an opening in the force absorbing element 104 that is connected to the horizontal passage 122 and allows air from the outside of the helmet 100 and/or the internal cavity 128 to enter into the horizontal passage 122 and through the vertical passage 124 to the front of a user's face, such as to a cavity defined by the user's face and his/her goggles, as indicated by arrow 132 in FIGS. 1A and 1B.

In one embodiment, the anchor features 116 are embedded into the force absorbing element 104 in areas that surround the vertical passage 124 and/or the horizontal passage 122 of the vents 120. By using the surface reinforcing component 110 with anchor features 116 near the vents 120, the size of the vents 120 may be larger without sacrificing the strength of the helmet. In particular, the thickness of the force absorbing element 104 surrounding the vents 120 may be thinner due to the added structural integrity being provided by the anchor features 116 of the surface reinforcing component 110. Furthermore, as indicated above the vent reinforcement feature 118 may be secured to an inner surface of the vent 120. In particular, the vent reinforcement feature 118 in FIGS. 1A-1C may be secured to an outer surface of the vertical channel 124 of the vent 120. The vent reinforcement feature 118 may provide further structural reinforcement to the force absorbing element 104 surrounding the vent.

Figure 2A:
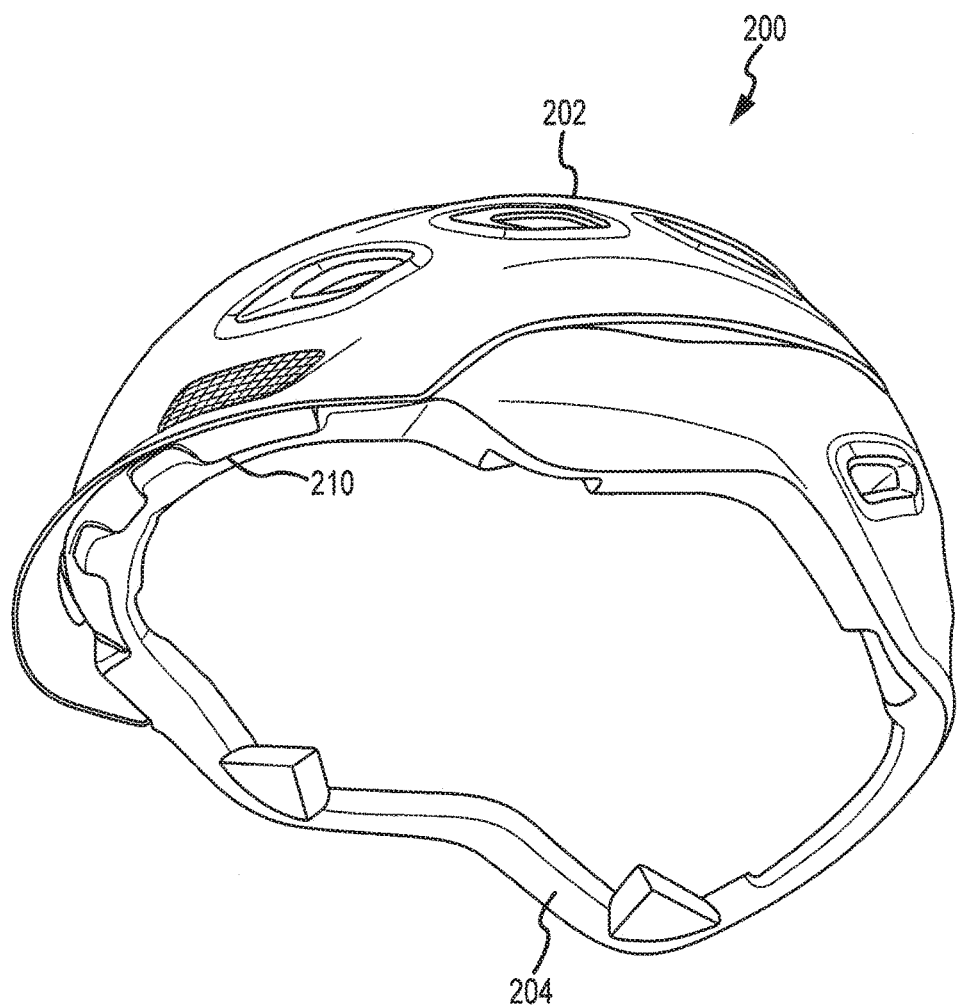
FIG. 2A is a bottom left isometric view of a helmet according to another embodiment of the invention.
Figure 2B:
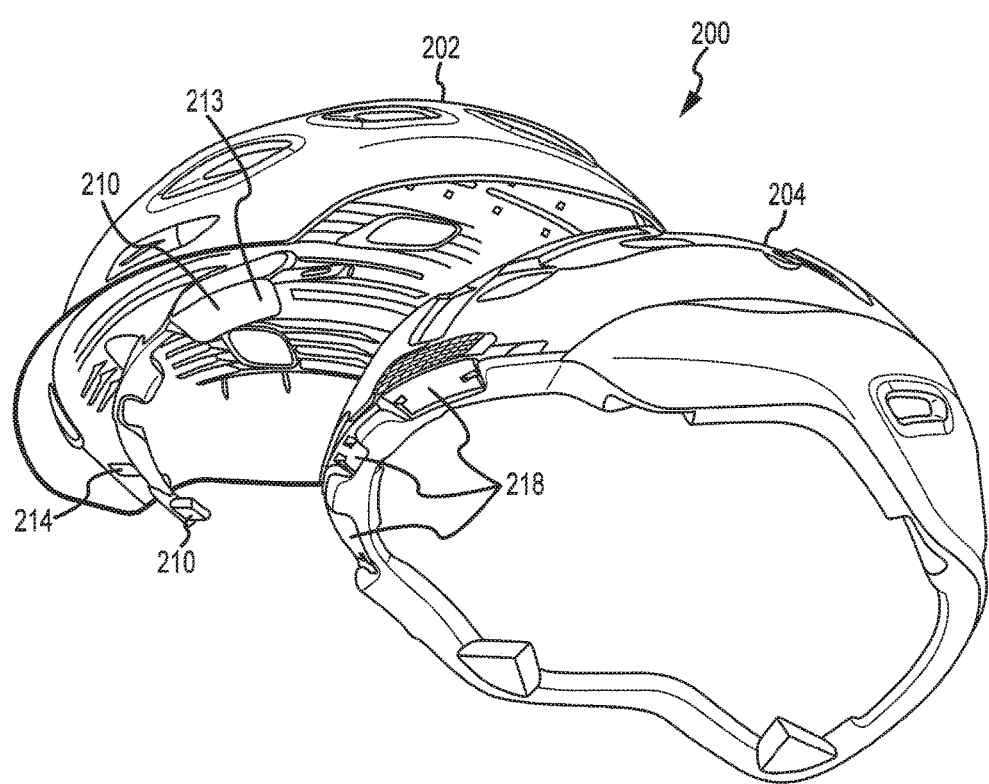
FIG. 2B is an exploded bottom left isometric view of the helmet shown in FIG. 2A.

FIG. 2A is a bottom left isometric view of a helmet according to another embodiment of the invention. FIG. 2B is an exploded bottom left isometric view of the helmet shown in FIG. 2A. The helmet 200 includes a shell 202, a force absorbing element 204, and a surface reinforcing component 210. The surface reinforcing component 210 may be secured to an outer surface 218 of the force absorbing element 204.

Figure 3A:
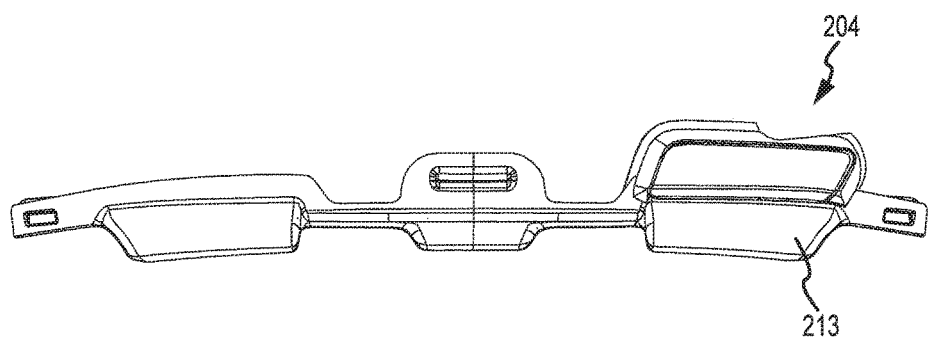
FIG. 3A is a front elevational view of the force absorbing component used in the helmet shown in FIGS. 2A and 2B according to one embodiment of the invention.
Figure 3B:
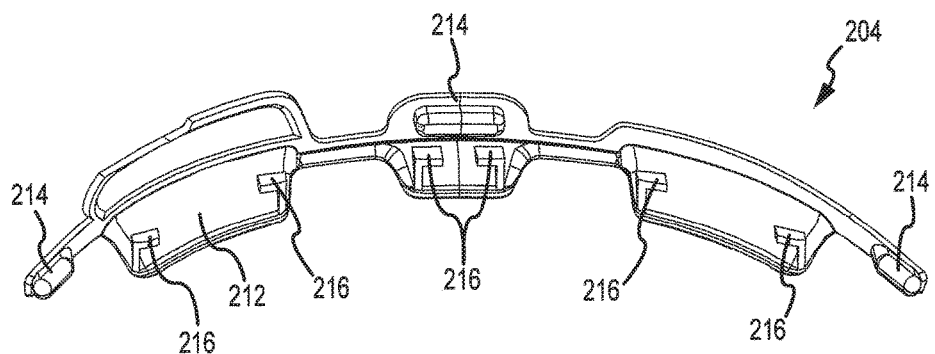
FIG. 3B is back elevational view of the force absorbing component shown in FIG. 3A.

FIG. 3A is a front elevational view of the surface reinforcing component used in the helmet shown in FIGS. 2A and 2B according to one embodiment of the invention. FIG. 3B is back elevational view of the surface reinforcing component shown in FIG. 3A. The surface reinforcing component 210 includes outer surface 213, inner surface 212, and anchor features 216. The anchor features 216 may be embedded into the force absorbing element 204. As indicated above, the embedded anchor features 216 may improve the structural integrity of the force absorbing element 204 and/or the shell 202, thus allowing at least a portion of the force absorbing element 204 and/or the shell 202 to be thinner while maintaining strength and durability.

In this embodiment, the surface reinforcing component 210 may further include one or more mechanical coupling components 214 configured to mate with respective mechanical coupling components 214 on the shell 202. The coupling components 214 on the surface reinforcing component 210 and the coupling components 214 on the inner surface of the shell 202 are configured to secure the shell 202 to the force absorbing element 204. The coupling components 214 may be any configuration operable to secure the shell 202 to the force absorbing element 204. For instance, in one embodiment the coupling components 214 on the surface reinforcing component 210 is a male component and the coupling components 214 on the shell 202 is a female component that receives the male component. As will be clear to a person having ordinary skill in the art any suitable mechanical coupling method may be used.

The positioning of the coupling components 214 on the shell 202 and the surface reinforcing component 210 may further be used as a positioning system. In particular, the position of the coupling components 214 on the force absorbing element 204 relative to the coupling components 214 on the shell 202 may indicate alignment of the shell 202 relative to the force absorbing element 204. In some embodiments, a back of the shell 202 may be further connected to a back of the force absorbing element 204. By using the coupling components 214 to couple the shell 202 to the force absorbing element 204, rather than using glue or double sided tape, the shell 202 may be removed and/or replaced.

In some embodiments, a method of making a helmet, such as the helmet 100 in FIG. 1, may comprise forming some parts by injection molding and other parts by insert molding. For instance, in one embodiment the surface reinforcing components 110 and the shell 102 may be formed by injection molding. These injection molded parts result in strong hard plastic parts that may provide structural integrity to the helmet 100. The force absorbing element 104 may be formed by insert molding.

Figure 4:
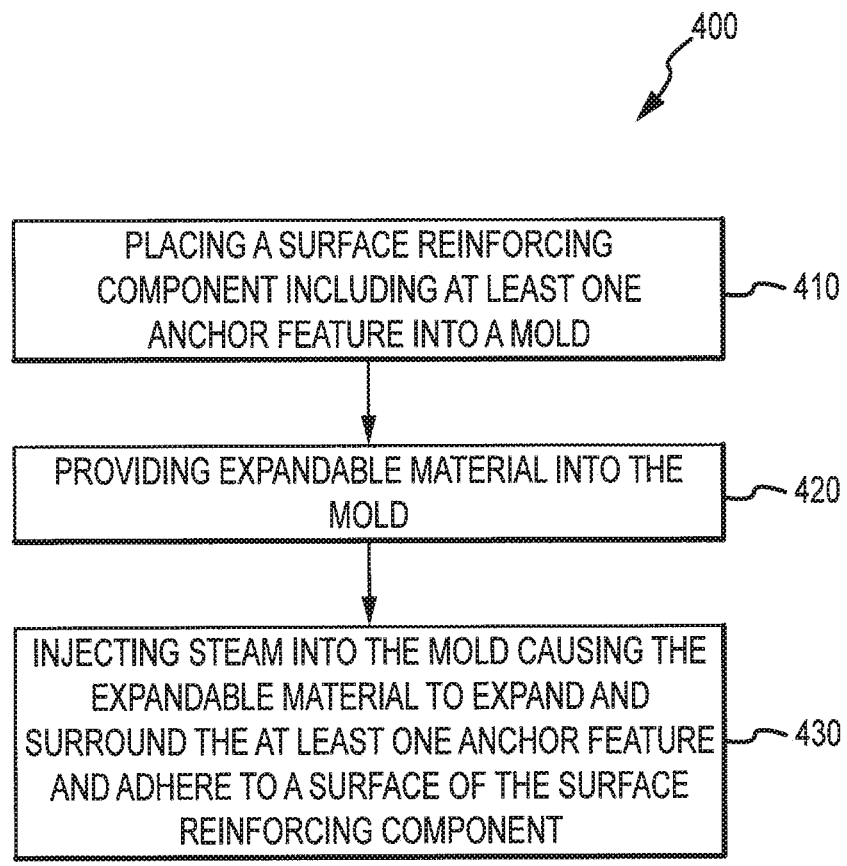
FIG. 4 is a flow chart illustrating a method of making a helmet according to one embodiment of the invention.

FIG. 4 is a flow chart illustrating a method 400 of making a helmet according to one embodiment of the invention. The method 400 may include step 410, which comprises placing a surface reinforcing component including at least one anchor feature into a mold. In some embodiments, the shell or a portion of the shell is placed in the mold as well. Step 420 comprises providing an expandable material into the mold. In one embodiment, the expandable material is expandable polystyrene. Step 430 comprises injecting heat into the mold to expand the material to surround the at least one anchor feature and adhere to a surface of the surface reinforcing component and any portion of the shell that has been placed in the mold. In one embodiment heat is injected into the mold by injecting steam into the mold. During step 430 the polystyrene may expand to form against an inner surface of the shell 102 and cover the anchor features 116 to form against an under surface of the surface reinforcing component 110. Thus, the anchor features 116 are embedded into the expanded polystyrene foam. The heat may be further used to further cause the shell and surface reinforcing component to bond to the expanded polystyrene foam. In some embodiments, a second shell may be further applied to an outer surface of the expanded polystyrene foam. The second shell may be applied to the outer surface of the expanded polystyrene foam by an adhesive or double sided tape.

Although the present invention has been described with reference to the disclosed embodiments, persons skilled in the art will recognize that changes may be made in form and detail without departing from the spirit and scope of the invention. Such modifications are well within the skill of those ordinarily skilled in the art. Accordingly, the invention is not limited except as by the appended claims.

What is claimed is:

1. A helmet comprising:
    a force absorbing element made from a first material;
    a shell secured to the force absorbing element; and
    a surface reinforcing component made from a second material harder than the first material, wherein the surface reinforcing component is arranged adjacent to a surface of the force absorbing element and comprises an anchor feature embedded in the force absorbing element, wherein the surface reinforcing component further comprises a lip configured to cover a portion of an edge of the shell.

2. The helmet of claim 1, wherein a surface of the surface reinforcing component is attached to a surface of the force absorbing element.

3. The helmet of claim 2, wherein the surface reinforcing component extends beyond a portion of an edge of the shell and is attached to the shell.

4. The helmet of claim 1, wherein the lip is attached to the portion of the edge of the shell.

5. The helmet of claim 1, wherein the anchor feature comprises a loop shaped structure, and wherein a portion of the force absorbing element extends through an opening defined by the loop shaped structure.

6. The helmet of claim 1, wherein the anchor feature comprises a hook disposed along a perimeter of the surface reinforcing component.

7. The helmet of claim 1, wherein the anchor feature comprises a plurality of interconnected loop shaped structures.

8. The helmet of claim 1, wherein the anchor feature is one of a plurality of anchor features embedded in the force absorbing element.

9. The helmet of claim 1 further comprising a vent through the shell, the force absorbing element, and the surface reinforcing component.

10. The helmet of claim 9, wherein the surface reinforcing component further comprises a vent reinforcement feature extending into the vent along an inner surface of the vent.

11. The helmet of claim 10, wherein the anchor feature is one of a plurality of anchor features arranged around the vent reinforcement feature.

12. The helmet of claim 1, wherein the surface reinforcing component further comprises a first coupling component and the shell comprises a second coupling component configured to mate with the first coupling component and at least partially secure the shell to the surface reinforcing component.

13. The helmet of claim 1, wherein the surface reinforcing component is disposed along a brim portion of the helmet.

14. A helmet comprising:
    a shell;
    a liner adjacent to the shell;
    a surface reinforcing component extending along a surface of the liner, the surface reinforcing component comprising a plurality of anchor features embedded in the liner, the surface reinforcing component further comprising a first coupling component configured to mate with a second coupling component on the shell to at least partially secure the liner to the shell;
    wherein the liner is made from polystyrene foam; and
    wherein the surface reinforcing component is made from a material harder than the polystyrene foam, and one or more of the plurality of anchor features comprise a loop, a hook, a pin, or an interconnected structure defining multiple passages there through.

15. The helmet of claim 14, wherein the surface reinforcing component comprises a plurality of first coupling components and the shell comprises a plurality of second coupling components each configured to mate with a respective one of the plurality of first coupling components.

16. The helmet of claim 14, wherein the shell is removably secured to the liner.

17. A helmet comprising:
    a force absorbing element made from a first material;
    a shell secured to the force absorbing element; and
    a surface reinforcing component made from a second material harder than the first material, wherein the surface reinforcing component is arranged adjacent to a surface of the force absorbing element and comprises an anchor feature embedded in the force absorbing element, wherein the anchor feature is one of a plurality of anchor features embedded in the force absorbing element.

18. The helmet of claim 17 further comprising a vent through the shell, force absorbing element, and the surface reinforcing component.

19. The helmet of claim 18, wherein the surface reinforcing component further comprises a vent reinforcement feature extending into the vent along an inner surface of the vent.

20. The helmet of claim 19, wherein the plurality of anchor features are arranged around the vent reinforcement feature.

21. The helmet of claim 17, wherein the surface reinforcing component further comprises a lip configured to cover a portion of an edge of the shell.

22. The helmet of claim 21, wherein the lip is attached to the portion of the edge of the shell.

23. The helmet of claim 17, wherein the plurality of anchor features comprises a loop shaped structure, and wherein a portion of the force absorbing element extends through an opening defined by the loop shaped structure.

24. The helmet of claim 17, wherein the plurality of anchor features comprises a hook disposed along a perimeter of the surface reinforcing component.

25. The helmet of claim 17, wherein the surface reinforcing component is disposed along a brim portion of the helmet.

* * * * *